United States Patent
Park et al.

(10) Patent No.: US 9,933,567 B2
(45) Date of Patent: Apr. 3, 2018

(54) PHOTONIC CRYSTAL STRUCTURE AND METHOD OF FABRICATING THE SAME

(71) Applicant: UNIVERSITY-INDUSTRY FOUNDATION (UIF), YONSEI UNIVERSITY, Seoul (KR)

(72) Inventors: Cheolmin Park, Seoul (KR); Han Sol Kang, Seoul (KR)

(73) Assignee: UNIVERSITY-INDUSTRY FOUNDATION (UIF), YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/698,309

(22) Filed: Sep. 7, 2017

(65) Prior Publication Data
US 2018/0067258 A1    Mar. 8, 2018

(30) Foreign Application Priority Data

Sep. 8, 2016 (KR) .................. 10-2016-0115510

(51) Int. Cl.
| | |
|---|---|
| G02B 6/028 | (2006.01) |
| G02B 6/12 | (2006.01) |
| G02B 6/122 | (2006.01) |
| G02B 6/02 | (2006.01) |
| G02F 1/313 | (2006.01) |
| C08F 212/08 | (2006.01) |
| B82Y 20/00 | (2011.01) |

(52) U.S. Cl.
CPC .......... *G02B 6/12007* (2013.01); *B82Y 20/00* (2013.01); *C08F 212/08* (2013.01); *G02B 6/02038* (2013.01); *G02B 6/1225* (2013.01); *G02F 1/313* (2013.01); *G02F 1/3132* (2013.01); *G02B 2006/12035* (2013.01); *G02F 2202/32* (2013.01)

(58) Field of Classification Search
CPC .. G02B 6/0288; G02B 6/0365; G02B 6/0281; G02B 6/03627; G02B 6/028
See application file for complete search history.

(56) References Cited

U.S. PATENT DOCUMENTS

| | | | | |
|---|---|---|---|---|
| 7,251,386 | B1 * | 7/2007 | Dickinson | B82Y 20/00 385/129 |
| 8,110,823 | B2 * | 2/2012 | Bowers | H01L 31/1852 257/14 |

* cited by examiner

*Primary Examiner* — Jennifer Doan

(57) ABSTRACT

Provided is a photonic crystal structure and the photonic crystal structure includes a polymer structure layer including a first polymer domain and a second polymer domain; and a photonic crystal material designed to be reversibly bonded to at least a portion of the first polymer domain to adjust a degree of swelling of the first polymer domain, thereby reflecting a light of a certain wavelength.

21 Claims, 13 Drawing Sheets

Color Test
EtOH : DI=1:1
APS 1.67wt%

PHOTONIC CRYSTAL STRUCTURE AND METHOD OF FABRICATING THE SAME

CROSS-REFERENCE TO RELATED APPLICATION

This application claims priority of Korean Patent Application No. 10-2016-0115510, filed on Sep. 8, 2016, in the KIPO (Korean Intellectual Property Office), the disclosure of which is incorporated herein entirely by reference.

BACKGROUND OF THE INVENTION

Field of the Invention

The present disclosure relates to a photonic crystal technique, and more particularly, to a photonic crystal structure and a method of fabricating the same.

Description of the Related Art

In order to realize a high-speed information society, there is an increasing need for development of a photo-electronic device with an improved efficiency and degree of integration. Therefore, application of a photonic crystal capable of controlling photons in a microscopic space is being spotlighted. A photonic crystal is a material having a photonic band gap in which an electromagnetic wave of a specific wavelength band is not transmitted as the refractive index of a material is periodically changed, thus being applicable to various photoelectric devices, such as an optical filter, a micro laser, an electroluminescent device, a photovoltaic device, an optical switch, and a sensor.

There are two popular methods for producing a photonic crystal. One is a top-down method based on nano-micro-machining, such as a lithography and an ion beam etching, and the other one is a bottom-up method using physical or chemical self-assemblies of colloidal particles or polymers.

However, since the top-down method uses micromachining technique, the overall fabrication process is complicated, expensive optical equipment is required, and a high cost is required. On the other hand, in the bottom-up method, it is difficult to control the colloid particles and, since only one stop-band may be expressed by one material at a time, it is necessary to grow or form photonic crystals by using different colloid solutions or polymers every time for forming a photonic crystal structure having various photonic bandgaps.

SUMMARY OF THE INVENTION

Provided is a photonic crystal structure capable of expressing various photonic bandgaps, being reversible, and being re-writable with fast reaction time.

Provided is a method of fabricating a photonic crystal structure having the above-stated advantages.

Additional aspects will be set forth in part in the description which follows and, in part, will be apparent from the description, or may be learned by practice of the presented embodiments.

According to an aspect of an embodiment, a photonic crystal structure includes a polymer structure layer comprising a first polymer domain and a second polymer domain; and a photonic crystal material configured to be reversibly bonded to at least a portion of the first polymer domain to adjust a degree of swelling of the first polymer domain, thereby reflecting a light of a certain wavelength.

The photonic crystal material may include any one or more of ammonium persulfate, sodium persulfate, potassium persulfate, and butyl hydroperoxide. The light of the certain wavelength to be reflected may vary according to a concentration of the photonic crystal material.

According to an embodiment, the first polymer domain may include any one or more of polyvinylpyridine, polymethylmethacrylate, poly(tert-butylacrylate), poly(ethylene oxide), polylactide, and polyhydroxystyrene, whereas the second polymer domain may include any one or more of polystyrene, polyisoprene, polycyclohexylethylene, and polymethylstyrene.

The first polymer domain including the photonic crystal material may have various thicknesses according to degrees of reversible bonding, and the light of the certain wavelength to be reflected may be determined according to the thickness of the first polymer domain including the photonic crystal material. According to an embodiment, the light may comprise a visible ray.

According to an embodiment, the polymer structure layer may have a laminar structure in which the first polymer domain and the second polymer domain are alternately stacked, wherein the bonding of the photonic crystal material may be decomposed by printing a photonic crystal removing material on the photonic crystal structure having printed thereon the photonic crystal material. For example, the photonic crystal removing material may be any one or more of hydrogen bromide, hydrochloric acid, and hydrogen iodide.

According to an aspect of another embodiment, a method of fabricating a photonic crystal structure, the method includes forming a polymer structure layer on a substrate through self-assemblies of block copolymers including a first polymer domain and a second polymer domain; printing a photonic crystal material that controls a domain of the polymer structure layer by being bonded to at least a portion of the polymer structure layer; and determining light of a certain wavelength reflected from the polymer structure layer by reversibly bonding the photonic crystal material to the at least a portion of the polymer structure layer. The photonic crystal material may include any one or more of ammonium persulfate, sodium persulfate, potassium persulfate, and butyl hydroperoxide.

According to an aspect of another embodiment, a display device includes a polymer structure layer comprising a first polymer domain and a second polymer domain and a photonic crystal structure including a photonic crystal material designed to be reversibly bonded to at least a portion of the first polymer domain to adjust a degree of swelling of the first polymer domain, thereby reflecting a light of a certain wavelength.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
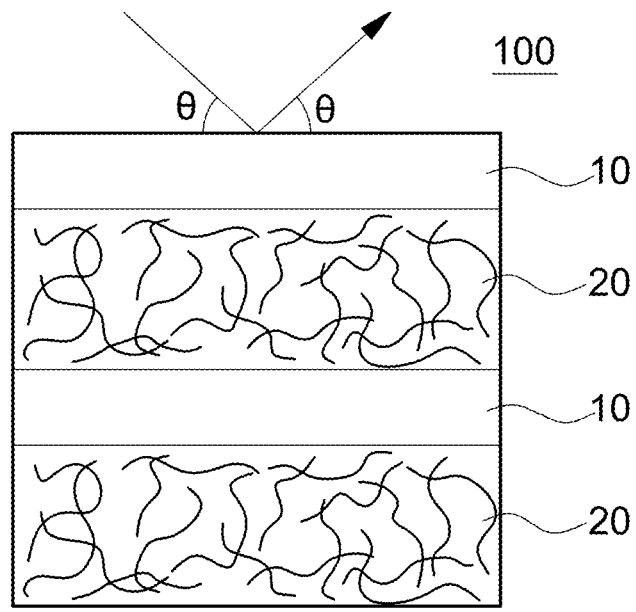
FIG. 1 is a cross-sectional view of a polymer structure layer of a photonic crystal structure according to an embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 2:
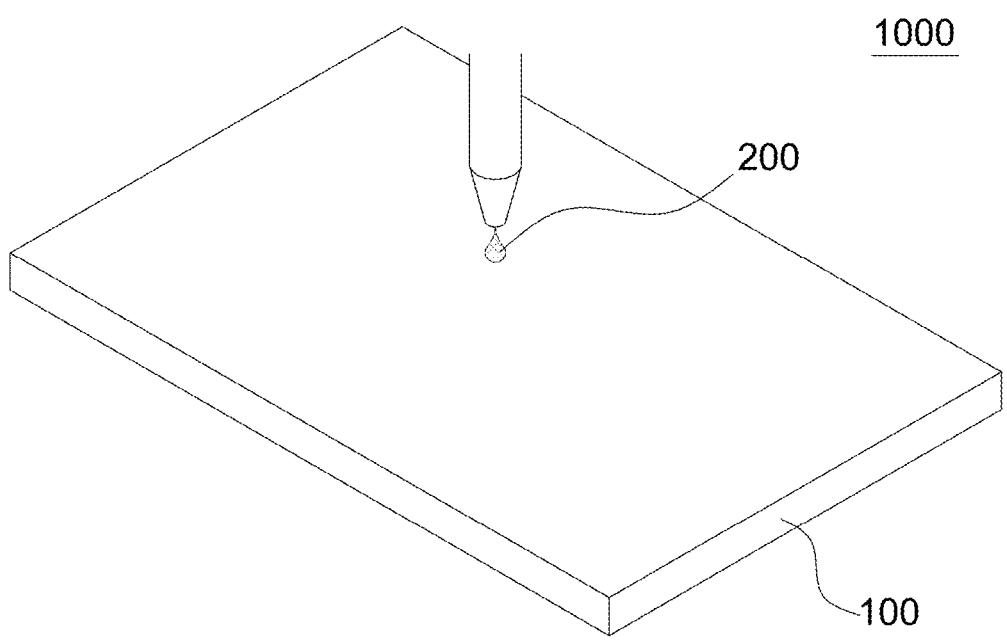
FIG. 2 is a diagram showing an inkjet printing technique, which is an example of methods for treating a photonic crystal material for forming a photonic crystal structure according to an embodiment of the present invention.

FIGS. 1 and 2 are cross-sectional views of a polymer structure layer in a photonic crystal structure and a method of printing a photonic crystal material, according to an embodiment of the present invention.

Referring to FIG. 1, a polymer structure layer 100 may be a block copolymer (BCP) including different polymer materials. For example, the polymer structure layer 100 may be a block copolymer in which first polymer domains 20 and second polymer domains 10 are alternately and repeatedly arranged. The first polymer domain 20 and the second polymer domain 10 may refer to regions predominantly occupied by hydrophilic polymers and hydrophobic polymers, respectively.

For example, the polymer structure layer 100 may be a polystyrene-poly(vinylpyridine) copolymer, a polystyrene-poly(methylmethacrylate) copolymer, a polystyrene-poly(tert-butylacrylate) copolymer, a (polyisoprene)-poly(ethylene oxide) copolymer, a polystyrene-polylactide copolymer, a poly(cyclohexylethylene)-polylactide copolymer, or a polymethylstyrene-polyhydroxystyrene copolymer, but the present invention is not limited thereto. At least one of the polyvinylpyridine, polymethylmethacrylate, poly(tert-butylacrylate), poly(ethylene oxide), polylactide, and polyhydroxystyrene may be included in the first polymer domain in which a hydrophilic polymer is dominant, whereas at least one of polystyrene, polyisoprene, polycyclohexylethylene, and polymethylstyrene may be included in the second polymer domain in which a hydrophobic polymer is dominant.

As shown in FIG. 2, a photonic crystal structure according to an embodiment of the present invention may be used in a printing apparatus, such as an inkjet printing apparatus 1000. Referring to FIG. 2, the inkjet printing apparatus 1000 uses the polymer structure layer 100 as an image output layer for outputting an image, and a photonic crystal material 200 for determining a certain reflection wavelength at a certain location may be printed at a desired location on the polymer structure layer 100 using nozzles of the inkjet printing apparatus 1000. According to an embodiment, the polymer structure layer 100 may be integrated with a substrate or may be formed on a separate substrate.

The printed photonic crystal material 200 may be absorbed by the polymer structure layer 100 and perform a bonding reaction with a portion of the polymer structure layer 100, and the wavelength of light reflected from the polymer structure layer due to the bonding reaction may be determined. The photonic crystal material 200 may be bound only in a certain polymer domain of the polymer structure layer 100.

According to an embodiment, the photonic crystal material 200 may only be bonded to the first polymer domain. The bonding reaction may be a crosslinking reaction, a covalent bonding, an ionic bonding, or a hydrogen bonding and may preferably be a crosslinking reaction or a covalent bonding. The photonic crystal material 200 may be directly bonded to the polymer of the first polymer domain or may be added after the first polymer domain swells as a solvent is added to the polymer structure layer 100 including the first polymer domain and bonded to the first polymer domain.

Figure 3:
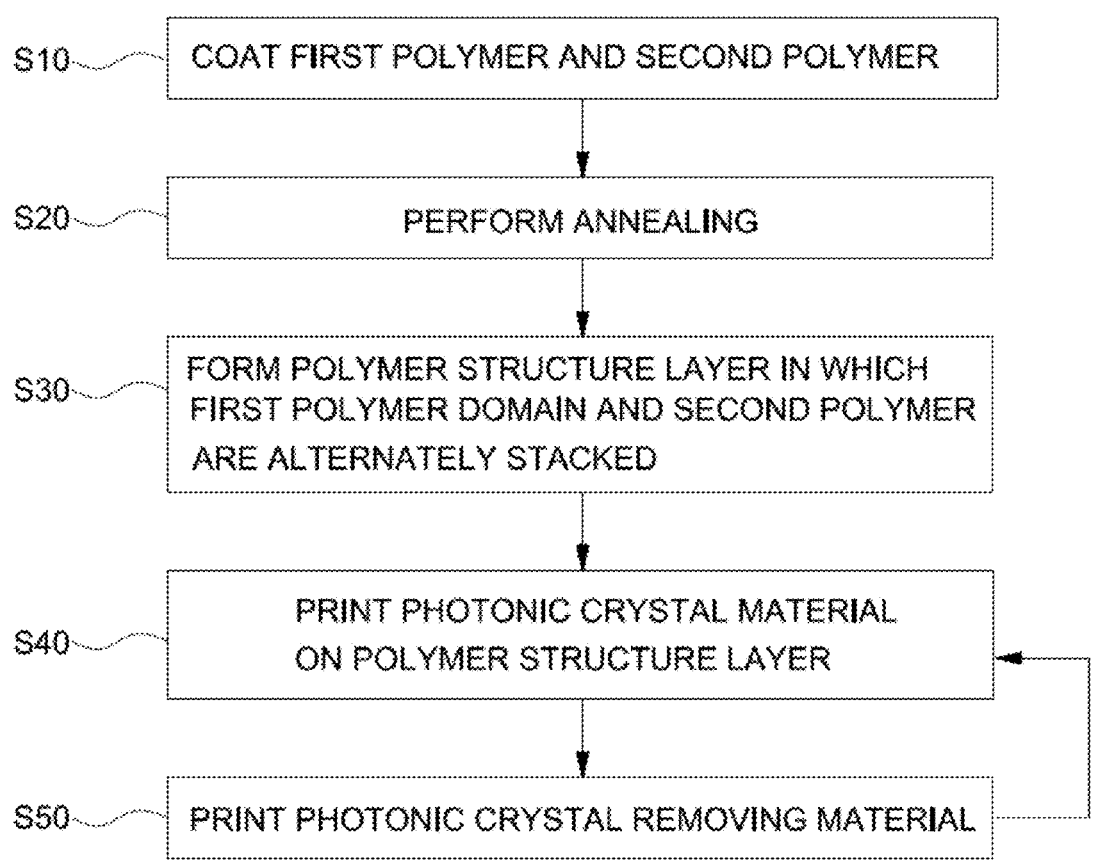
FIG. 3 is a flowchart showing a method of fabricating a photonic crystal structure according to an embodiment of the present invention.
Figure 4:
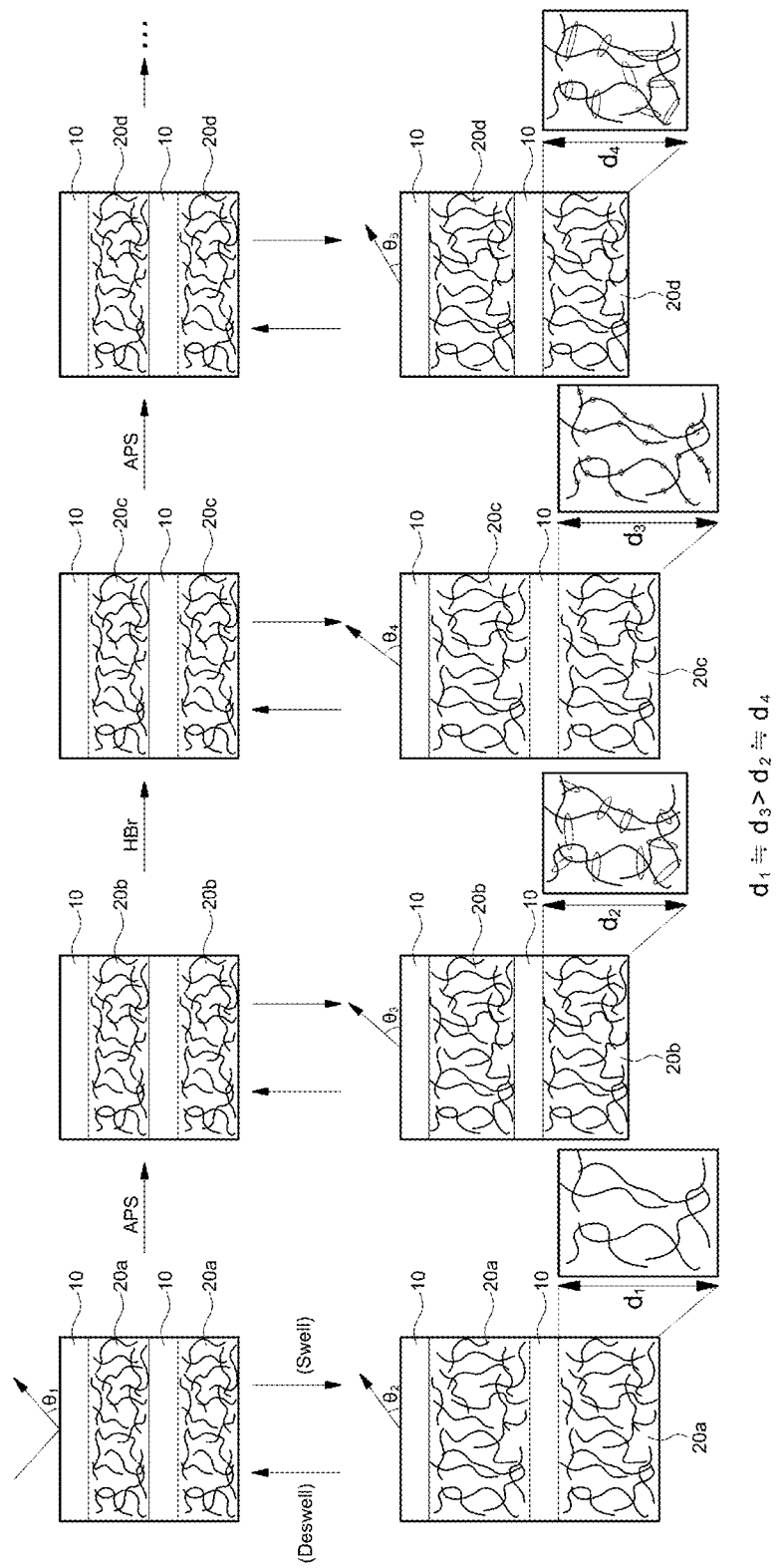
FIG. 4 is a schematic diagram showing a method of determining a predetermined wavelength of light reversibly reflected from a photonic crystal structure according to an embodiment of the present invention.

FIG. 3 is a flowchart showing a method of fabricating a photonic crystal structure according to an embodiment of the present invention, and FIG. 4 is a schematic diagram showing a method of determining a predetermined wavelength of light reversibly reflected from a photonic crystal structure according to an embodiment of the present invention.

Referring to FIG. 3, a block copolymer solution containing a first polymer, a second polymer, and a dispersing solvent is prepared, and a polymer structure layer including a self-assembled block copolymer may be formed by applying the block copolymer solution onto a substrate in the form of a film (operation S10). The first polymer may be a polymer having a quarternized bond group and pyridine in which carbon atoms in the benzene ring is substituted with nitrogen atoms that facilitate hydrogen bonding, and the second polymer may be polystyrene. Preferably, the first polymer may be quaternized 2 vinyl pyridine (QP2VP), and the second polymer may be polystyrene (PS).

The dispersing solvent may be any one from among aliphatic or aromatic hydrocarbons (e.g., heptane, toluene, etc.), halogenated aliphatic, aromatic hydrocarbons (e.g., dichloromethane, bromobenzene, etc.), ethers (e.g., diethyl ether), alcohol, or a mixture thereof. Preferably, the dispersing solvent may be benzene, ethanol, or propylene glycol methyl ether acetate (PGMEA).

According to an embodiment, the first polymer and the second polymer mixed under the dispersing solvent may be coated or printed on a substrate to form a polymer structure layer in the form of the block copolymer. The coating or printing method may include spin coating, spray coating, dip coating, screen printing, inkjet printing, vacuum filtration, impregnation coating, application coating, drop casting, or doctor blade. The first polymer and the second polymer may be bonded to each other and self-assembled due to functional groups included in the first polymer and the second polymer. The self-assembled polymer structure layer may have a structure in which the first polymer domains and the second polymer domains are alternately and repeated arranged. The block copolymer may be a polystyrene-poly(vinylpyridine) copolymer, a polystyrene-poly(methylmethacrylate) copolymer, a polystyrene-poly(tert-butylacrylate) copolymer, a (polyisoprene)-poly(ethylene oxide) copolymer, a polystyrene-polylactide copolymer, a poly(cyclohexylethylene)-polylactide copolymer, or a polymethylstyrene-polyhydroxystyrene copolymer. Preferably, the block copolymer may be a polystyrene-quaternized-polyvinylpyridine copolymer (PS-b-QP2VP).

A block copolymer having a laminar structure in which the first polymer and the second polymer are alternately stacked may be formed. Next, an annealing operation may be performed (operation S20). The annealing operation may be performed using a thermal annealing method or a solvent annealing method.

In the annealing operation, a polymer structure layer with significantly improved repetition alignment of the first polymer and the second polymer in the mixed solution may be formed (operation S30). The repetition alignment structure of the first polymer domain and the second polymer domain in the polymer structure layer may be a laminar structure, a cylinder structure, or a spherical structure depending on the volume fractions of the first polymer and the second polymer contained in the polymer structure layer. Preferably, the first polymer block and the second polymer block in the polymer structure layer may have similar volume fractions to each other, and thus the first polymer domain and the second polymer domain in the polymer structure layer may be repeatedly aligned as a lamina structure.

Next, a photonic crystal material that may be bonded to at least a portion of the polymer structure layer and change the wavelength of reflected light of the polymer structure layer may be printed on the polymer structure layer (operation S40). The photonic crystal material may be selectively bonded to any one of the polymer structure layers. For example, the photonic crystal material may be simultaneously or separately bonded to two or more quaternized bonding groups of the first polymer domain so as to crosslink the first polymers in the first polymer domain.

The photonic crystal material is not limited as long as it is a material having a bonding group capable of reacting with some bonding groups of the first polymer domain, but it may preferably be ammonium persulfate (APS). The photonic crystal material may react with some bonding groups of the first polymer domain and may form a crosslink by reacting with some quaternary bonding groups of the first polymer domain.

As described above, as compared to a domain without the crosslink, when at least some of domains of the polymer structure layer is swelled by dipping a selective solvent to the polymer structure layer, the first polymer domain in which a crosslink is formed may swell relatively less due to the crosslink. The wavelength of light reflected from the polymer structure layer may be changed due to the controlling of swelling based on the crosslink. Detailed descriptions thereof will be given below with reference to FIG. 4.

The polymer structure layer having the crosslink may be dipped in a selective solvent, thereby swelling any one domain of the polymer structure layer (operation S50). At this time, when the selective solvent is a hydrophilic solvent, the first polymer domain, which is a hydrophilic polymer domain, may be selectively swelled. According to an embodiment, the hydrophilic solvent may be water or a hydrophilic organic solvent, and the hydrophilic organic solvent may be an alcohol.

According to an embodiment, a suitable additive may be added to facilitate selective infiltration of the hydrophilic solvent into the first polymer domain. For example, when the hydrophilic polymer in the first polymer domain is poly(2-vinylpyridine), pyridine is quaternized to pyridinium through a nucleophilic substitution between nitrogen of the pyridine and an additive, such as haloalkane, thereby facilitating infiltration of the hydrophilic solvent. The hydrophilic solvent may be water. Further, the haloalkane may be bromoethane or methyl iodide. The operation S40 for printing the photonic crystal material may be performed after the operation S50 for swelling using a selective solvent.

The crosslink formed between the photonic crystal material and at least a portion of the first polymer domain may then be reversibly decomposed by printing a photonic crystal removing material on the polymer structure layer (operation S60). The photonic crystal structure according to an embodiment of the present invention exhibits reversible reaction for forming the crosslink of the photonic crystal material and easily decomposing the crosslink by using the photonic crystal removing material. Therefore, various images may be displayed by using the polymer structure layer as a film.

The photonic crystal removing material may be hydrogen bromide, hydrochloric acid, hydrogen iodide and may preferably be hydrogen bromide. The photonic crystal removing material may selectively penetrate into the first polymer domain of the polymer structure layer during a printing operation and decompose and remove the crosslink formed in the first polymer domain. As such, when the crosslink is decomposed, a light of a predetermined wavelength, which is generally reflected by the first polymer domain, may be output.

Therefore, in the photonic crystal structure a crosslink between the first polymers may be rapidly formed by the photonic crystal material in the first polymer domain, and the crosslink may be reversibly decomposed by the photonic crystal removing material. Therefore, the photonic crystal structure according to an embodiment of the present invention may be used repeatedly to generate various light.

Referring to FIG. 4, a polymer structure layer including a first polymer domain 10 and a second polymer domain 20$a$ may reflect light wavelength having a reflection angle of θ1. In this case, when the polymer structure layer is dipped into a hydrophilic solvent, the size d1 of the first polymer domain may be increased as the first polymer domain selectively swells. As described above, an angle of reflected light wavelength may be determined as angle θ2 according to the increased size d1 of the first polymer domain. On the contrary, when the hydrophilic solvent is removed, the first polymer domain may be reversibly deswelled, and thus the size of the first polymer domain may be reduced.

Next, when a photonic crystal material (APS) is printed on the polymer structure layer, the photonic crystal material is selectively absorbed into a first polymer domain 20$b$ in the polymer structure layer, thereby forming a crosslink between the first polymers. When the first polymer domain 20$b$ is dipped into the hydrophilic solvent, the first polymer domain 20$b$ may swell to a relatively small size d2 due to the crosslink formed in at least a portion of the first polymer domain 20$b$ as compared to the first polymer domain 20$a$ of the polymer structure layer without a crosslink. Therefore, the photonic crystal structure in which a crosslink is formed in the first polymer domain by the photonic crystal material may reflect different light wavelength having the reflection angle of θ3.

The crosslink of the photonic crystal structure may be reversibly decomposed by a photonic crystal removing material (HBr). The photonic crystal removing material may selectively penetrate into the first polymer domain and decompose the crosslink. As such, when the crosslink is decomposed, the photonic crystal structure dipped into a hydrophilic solvent may swell, such that the size d3 of the first polymer domain is larger than that of the first polymer domain in a case where the cross-link is formed.

Next, when the photonic crystal material is printed again, a crosslink may be formed again in the first polymer domain, and thus the size of the swelling first polymer domain may be changed. As described above, the formation and decomposition of the crosslink in the first polymer domain due to the photonic crystal material and the photonic crystal removing material may be reversible reactions and may be repeatedly performed. Therefore, the photonic crystal structure according to the present invention may control a light of a predetermined wavelength reflected from the photonic crystal structure by adjusting a degree of the crosslink according to a concentration of the photonic crystal material, and light of certain wavelengths different from one another may be repeatedly displayed due to reversible reactions of the crosslink.

Figure 5:
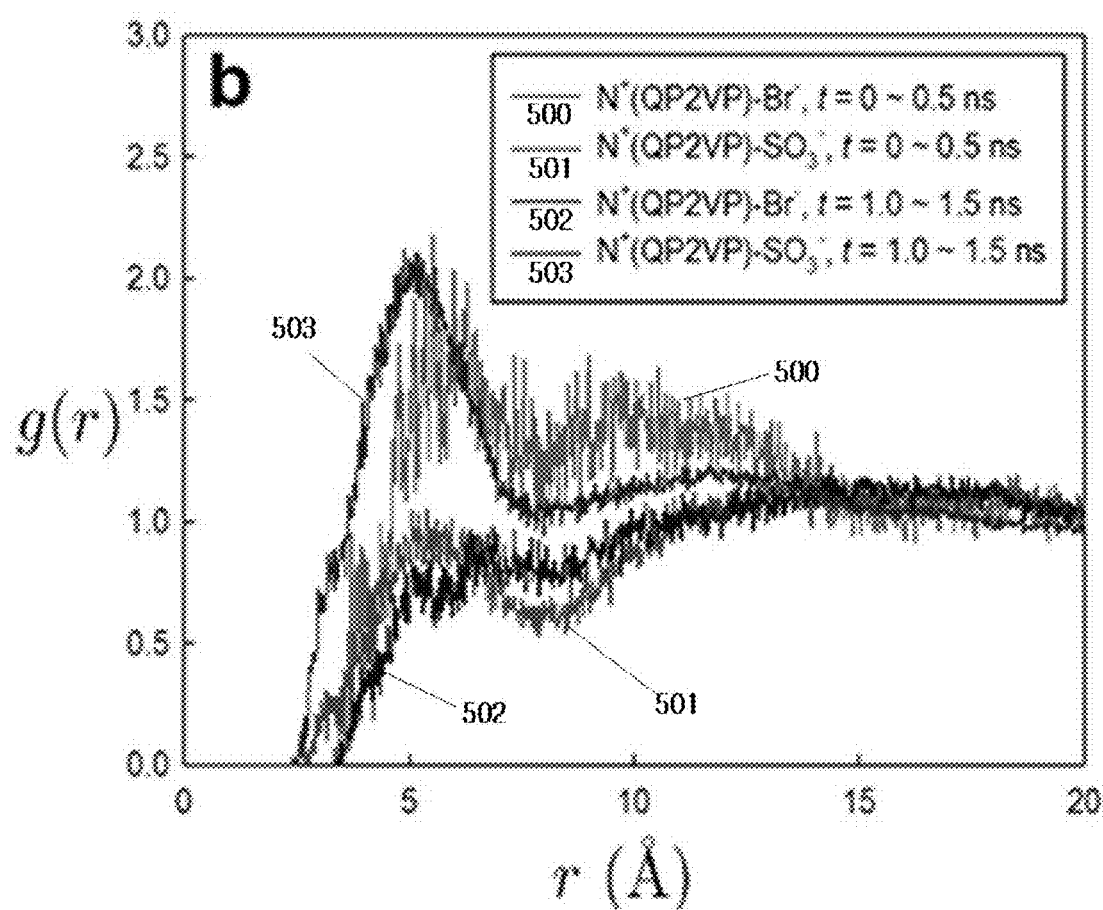
FIG. 5 is diagram showing a result of a molecular dynamics simulation for observing a degree of ion exchange of a photonic crystal structure according to an embodiment of the present invention.

FIG. 5 is diagram showing a result of a molecular dynamics simulation for observing the degree of ion exchange of a photonic crystal structure according to an embodiment of the present invention. Before the photonic crystal material is coated or printed on the polymer structure layer, in order to observe the degree of ion exchange in the polymer structure layer, the polymer structure layer is formed with reference to FIGS. 1 through 3.

In order to measure the degree of ion exchange between different ions, an MD simulation according to the lapse of time was performed with respect to an 1:1 mixed solution of water and ethanol including ions paired to bond $QP2VP^+..Br^-$ to $NH4^+..SO_3$—O—$OSO_3$—$.NH_4^+$. Within the first 0.5 ns, the concentration of $QP2VP^+..Br^-$ was higher than that of $NH4^+..SO_3^-$. However, in the time period from 1.0 ns to 1.5 ns, there were more bonds of $NH4^+..SO_3^-$ than $QP2VP^+..Br^-$, and an equilibrium was formed after 2.0 ns. Therefore, crosslinks between $QP2VP^+..SO_3$—O—$OSO_3^-..QP2VP^+$ in the first polymer domain may occur due to ion exchanges when a photonic crystal material is printed on the polymer structure layer.

FIGS. 6A through 6D are graphs of an infrared absorption spectroscopy (FT-IR), a spherical aberration correction transmission electron microscope (Cs-corrected STEM), energy dispersive X-ray analysis (EDX), and X-ray photoelectron spectroscopy (XPS) for observing a compound contained in a photonic crystal structure layer according to an embodiment of the present invention.

Figure 6A:
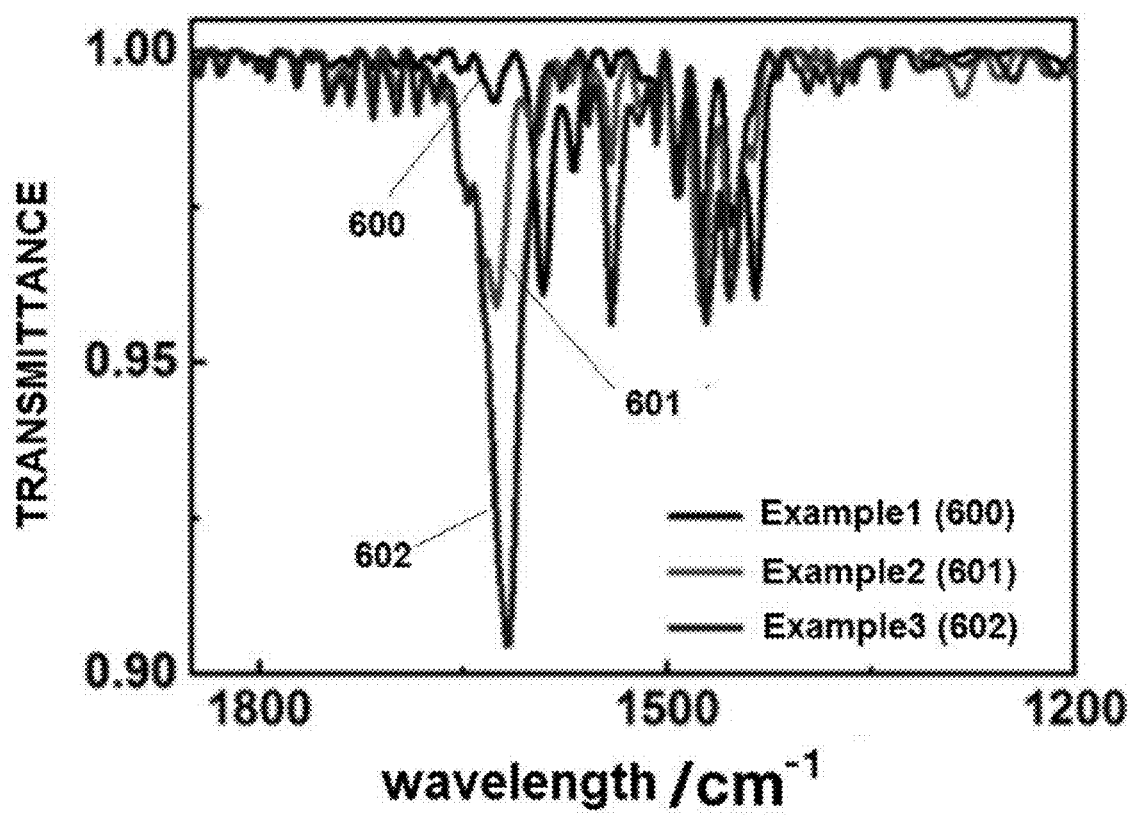
FIGS. 6A through 6D are graphs of an infrared absorption spectroscopy (FT-IR), a spherical aberration correction transmission electron microscope (Cs-corrected STEM), energy dispersive X-ray analysis (EDX), and X-ray photoelectron spectroscopy (XPS) for observing a compound contained in a photonic crystal structure layer according to an embodiment of the present invention.

First, FIG. 6A is a graph showing results of infrared absorption spectroscopy (FT-IR) performed with respect to a polymer structure layer treated with bromoethanol (BrEt) (Example 1), a photonic crystal structure in which a photonic crystal material (APS) is printed on the polymer structure layer (Example 2), and a photonic crystal structure treated with hydrogen bromide (HBr) after formation of the photonic crystal structure (Example 3). FIG. 6A shows that more peaks were observed at about 1630 cm-1 in Example 2 and Example 3 than in Example 1. It may be seen that the quaternary amine groups are significantly increased in Example 2 treated with ammonium sulfate, which is a photonic crystal material, as compared to Example 1, which is a polymer structure layer treated with bromoethanol. In other words, persulfate ions are predominantly present around the quaternary amine.

It may also be seen that light absorbance at about 1630 cm-1 is further increased in Example 3 further treated with hydrogen bromide (HBr) as compared to Example 2. The reason thereof is that the quaternary amine groups reacting with bromine anions are further increased by hydrogen bromide.

Figure 6B:
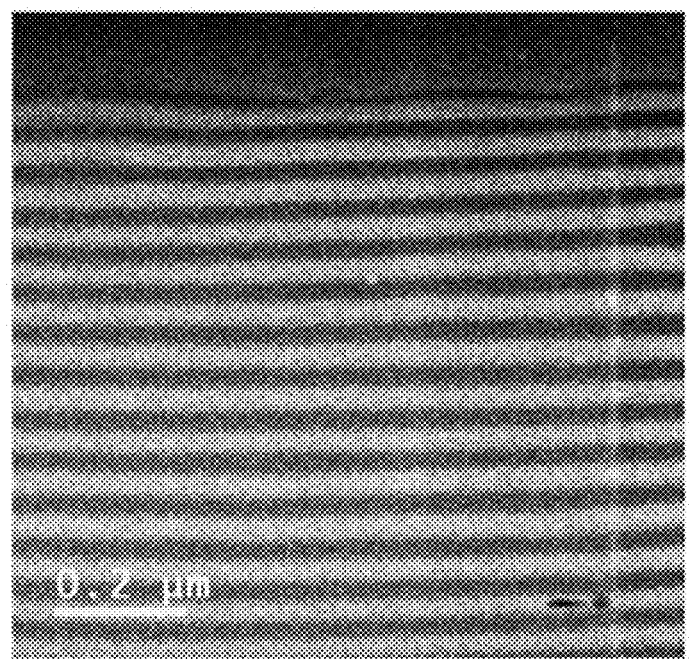
Figure 6C:
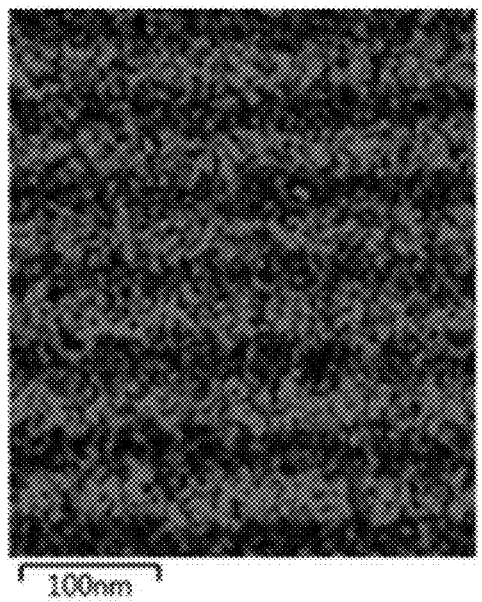
Figure 6C:
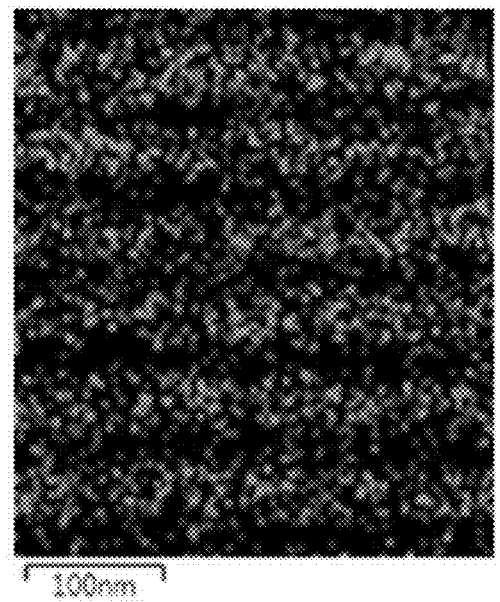

FIGS. 6B and 6C are a SEM sectional image and an EDX analysis result regarding a photonic crystal structure formed by printing ammonium sulfate (APS) on the polymer structure layer as a photonic crystal material. Referring to FIG. 6B, the photonic crystal structure according to an embodiment of the present invention retains a laminar structure, in which the first polymer domains and the second polymer domains are alternately stacked, even after the photonic crystal material is printed. Furthermore, referring to FIG. 6C, it may be seen that the locations where sulfur (S) atoms are arranged and locations where nitrogen (N) atoms are arranged in the cross-section of the photonic crystal structure are similar to each other. This indicates that the photonic crystal material including sulfur atoms is predominantly doped to the first polymer domain including nitrogen atoms. Table 1 below shows the contents of elements contained in the first polymer domain after the photonic crystal material is treated.

TABLE 1

| Ingredient | C | N | O | S | Br | Total |
|---|---|---|---|---|---|---|
| Ratio (%) | 88.1 | 2.2 | 6.9 | 2.8 | 0.0 | 100.0 |

Referring to Table 1, it may be seen that the content of bromine atoms contained in the first polymer domain is almost zero after the photonic crystal material is printed. This indicates that, when the photonic crystal material is printed on the polymer structure layer, ion exchange reaction takes place mostly from bromine ethanol in the first polymer domain to ammonium sulfate, which is an example of the photonic crystal material.

Figure 6D:
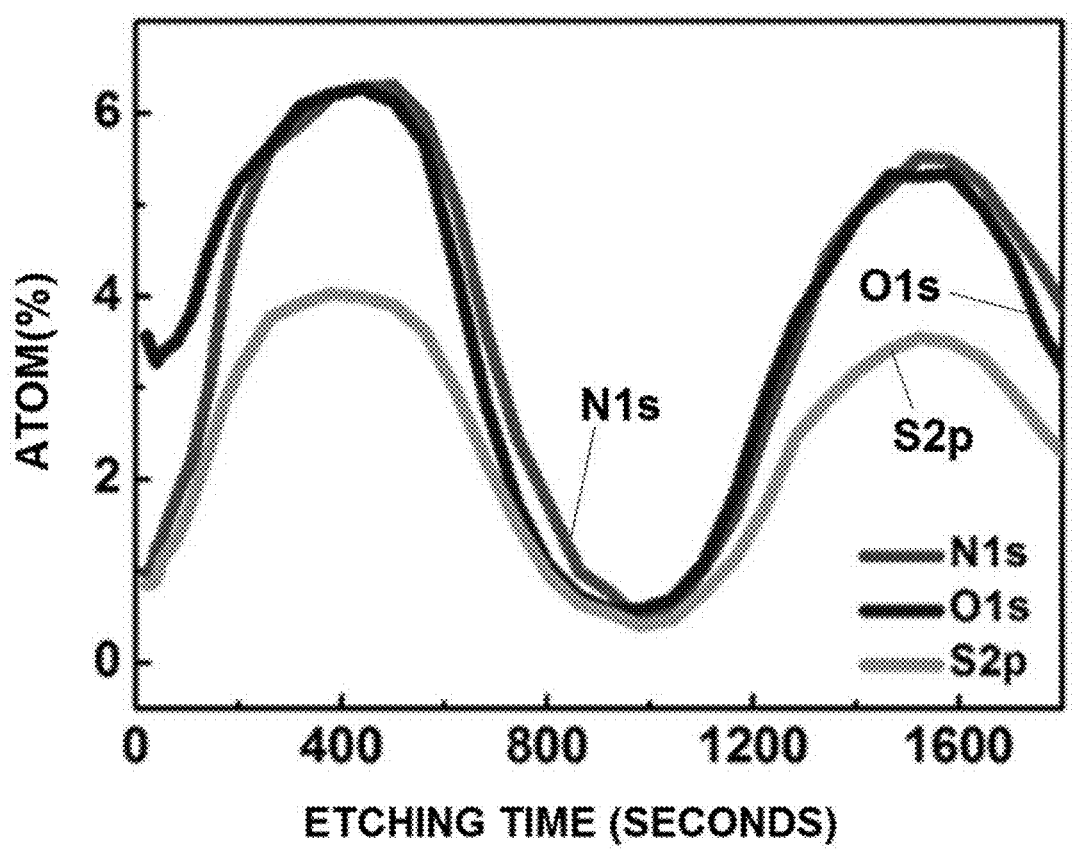

In order to confirm that the photonic crystal material is predominantly doped to the first polymer domain, X-ray photoelectron spectroscopy was performed with respect to the photonic crystal structure, in which a crosslink is formed between the photonic crystal material and the polymer structure layer, while the photonic crystal structure was being etched from the top surface, and a result thereof is shown in FIG. 6D. Referring to FIG. 6D, the photonic crystal structure of the laminar structure is measured as the first polymer domain and the second polymer domain are exposed according to the etching time. Since $O1s$ and $S2p$ were measured at the time point where the first polymer domain in which $N1s$ including nitrogen is measured is exposed (about 400 seconds and about 1600 seconds), ammonium sulfate, which is the photonic crystal material, is selectively bonded to the first polymer domain.

Figure 7A:
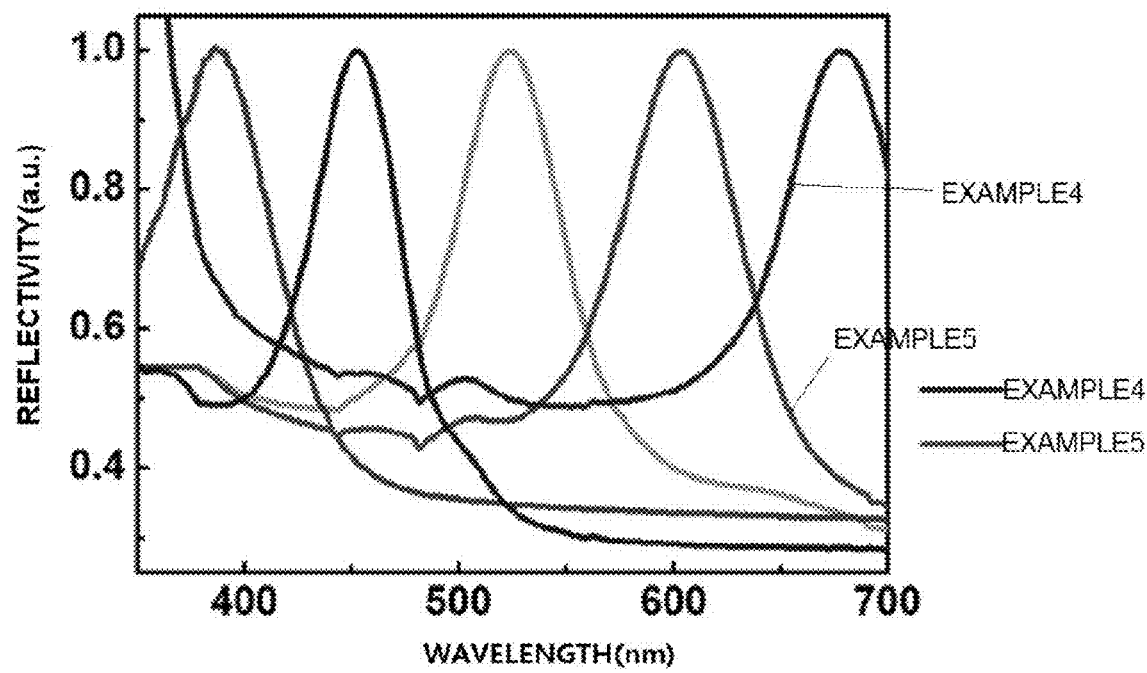
FIGS. 7A through 7C show experimental results of a US-vis spectrophotometer to measure a photonic bandgap of a photonic crystal structure according to the concentration of a photonic crystal material and a color image expressed by the photonic crystal structure.
Figure 7B:
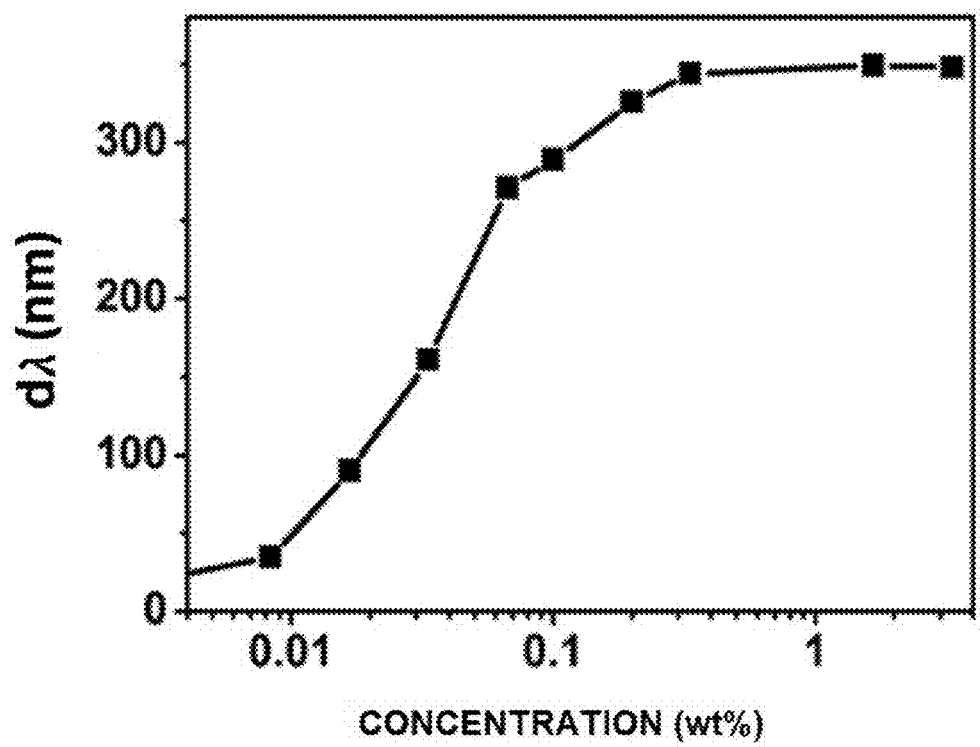
Figure 7C:
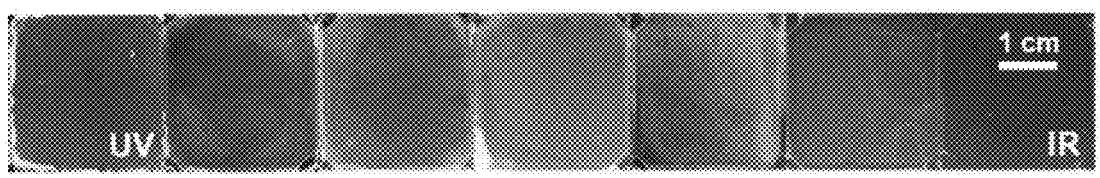

The photonic crystal structure according to an embodiment of the present invention may reflect light of wavelengths having various photonic bandgaps. FIGS. 7A through 7C show experimental results of a US-vis spectrophotometer to measure the photonic bandgap of a photonic crystal structure according to the concentration of a photonic crystal material and a color image expressed by the photonic crystal structure.

Referring to FIG. 7A, a photonic crystal structure composed of only a polymer structure layer before a photonic crystal material is printed (Example 4) exhibits the maximum reflection wavelength at about 680 nm. Next, the first polymer domain is swollen by ethanol, and thus the size of the first polymer domain may increase by about 7 times or more than before the first polymer domain swells. When the photonic crystal material is printed and a crosslink is formed, the degree of the swelling may be smaller than that in a case where the crosslink is not formed. As shown in FIG. 7A, as the degree of swelling increases, the maximum reflection wavelength may decrease.

According to an embodiment, a maximum reflection wavelength of the photonic crystal structure may be controlled within the visible ray domain according to a concentration of the photonic crystal material. Referring to FIG. 7B, when the concentration of the photonic crystal material is 0, the maximum reflection wavelength of the photonic crystal structure is about 30 nm. As the concentration of the photonic crystal material approaches to 1 wt %, a peak of the maximum reflection wavelength of the photonic crystal structure is blue shifted to as much as about 350 nm. Referring to FIG. 7C, it may be seen that, since the photonic crystal structure may display various colors of the visible ray domains according to the concentration of the photonic crystal material, the photonic crystal structure is suitable as a photonic crystal structure for a full color display.

As described above, to be used as a photonic crystal structure for a full color display, it is important whether a crosslink due to the photonic crystal material is rapidly formed to express information.

Figure 8:
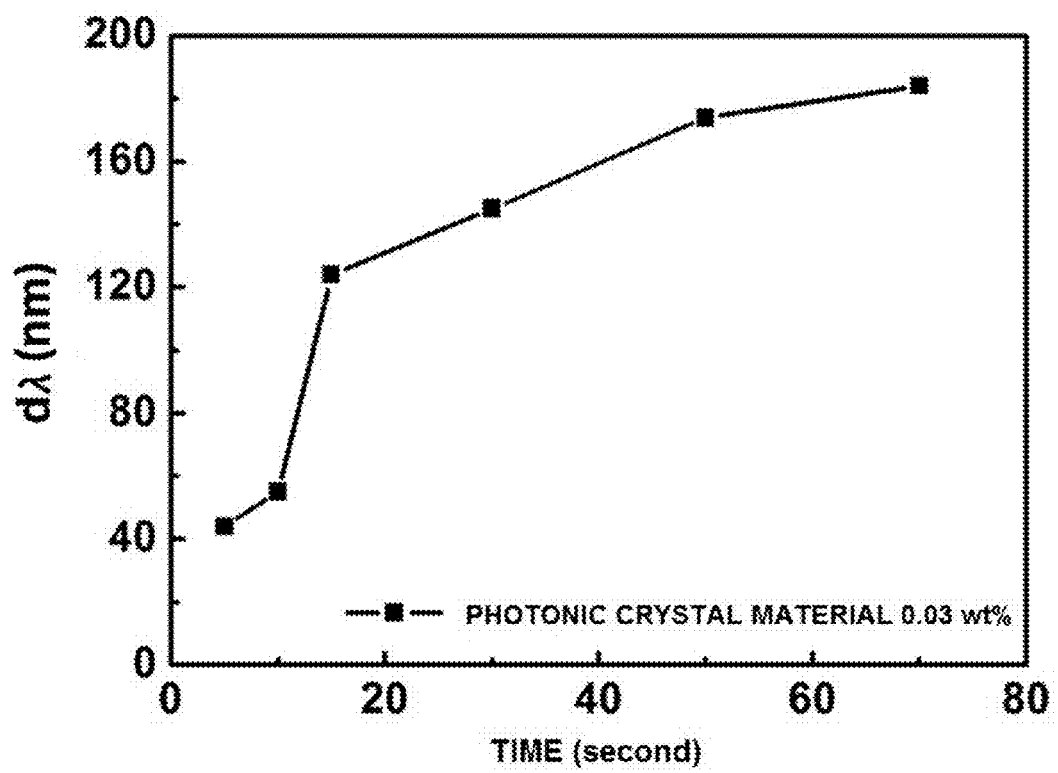
FIG. 8 is a graph showing the maximum reflection wavelengths of a photonic crystal structure measured according to time periods of exposure to a solvent after printing photonic crystal materials of a same concentration on a polymer structure layer.

FIG. 8 is a graph showing the maximum reflection wavelengths of a photonic crystal structure measured according to time periods of exposure to a solvent after printing photonic crystal materials of a same concentration on a polymer structure layer. Here, the concentration of the photonic crystal material was fixed to 0.03 wt %.

Referring to FIG. 8, it may be seen that the maximum reflection wavelength of about 40 m immediately after the printing was rapidly increased to about 120 nm or higher after about 15 seconds. It may be seen that information may be read by the photonic crystal structure of the present invention after about 15 seconds from a writing operation of the photonic crystal material.

In order for a photonic crystal structure to be used in a device that represents full colors, it is necessary for a photonic crystal material to rapidly form a crosslink and accurately express colors at desired locations. FIGS. 9A through 9F are diagrams showing a method of expressing a full color image quickly and accurately by applying a photonic crystal structure according to the present invention to a general inkjet printer, and the full color image.

Figure 9A:
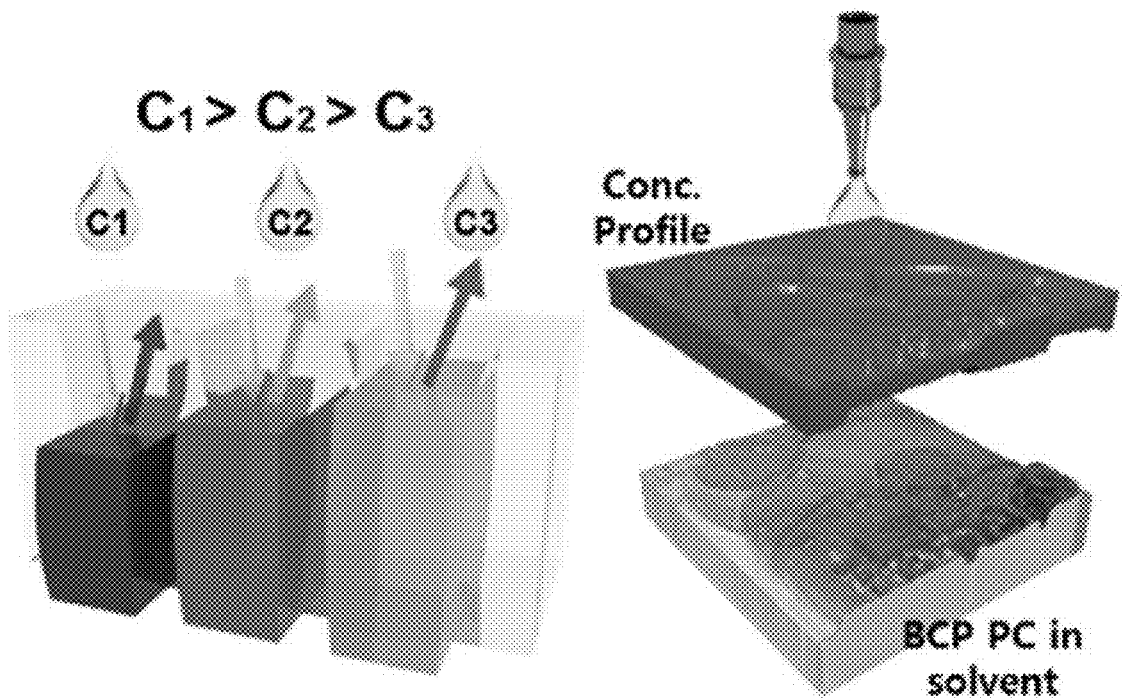
FIGS. 9A through 9F are diagrams showing a method of expressing a full color image quickly and accurately by applying a photonic crystal structure according to the present invention to a general inkjet printer, and the full color image.

As described above with reference to FIGS. 7a through 8, the maximum reflection wavelength of the photonic crystal structure may be determined based on the concentration of a photonic crystal material. In order to form the photonic crystal structure by using a general ink jet printer, the concentration of a photonic crystal material necessary for expressing the entire visible ray domain may be programmed first. Referring to FIG. 9A, photonic crystal materials capable of reflecting light of wavelengths in blue, green, and red domains, that is, photonic crystal materials having the concentrations of C1, C2, and C3 in the descending order, are dropped through nozzles of the printer, the first polymer domain of the polymer structure layer swells less due to a crosslink in a region where the photonic crystal material is dominantly printed, and thus the region in which the photonic crystal materials are printed at the concentrations of C1, C2, and C3 may reflect blue light, green light, and red light.

Figure 9B:
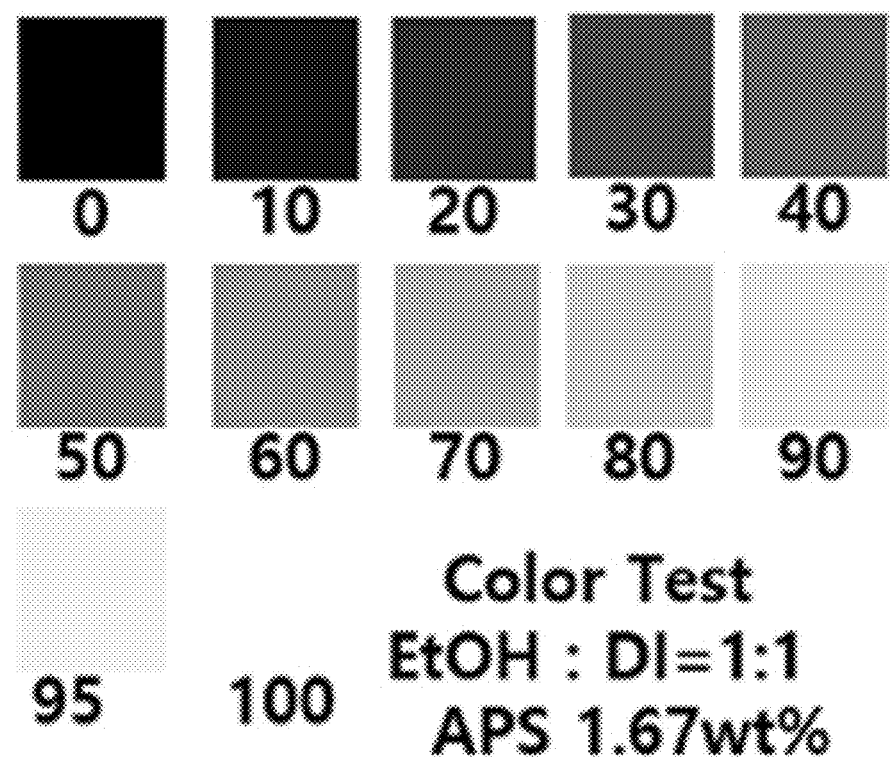
Figure 9C:
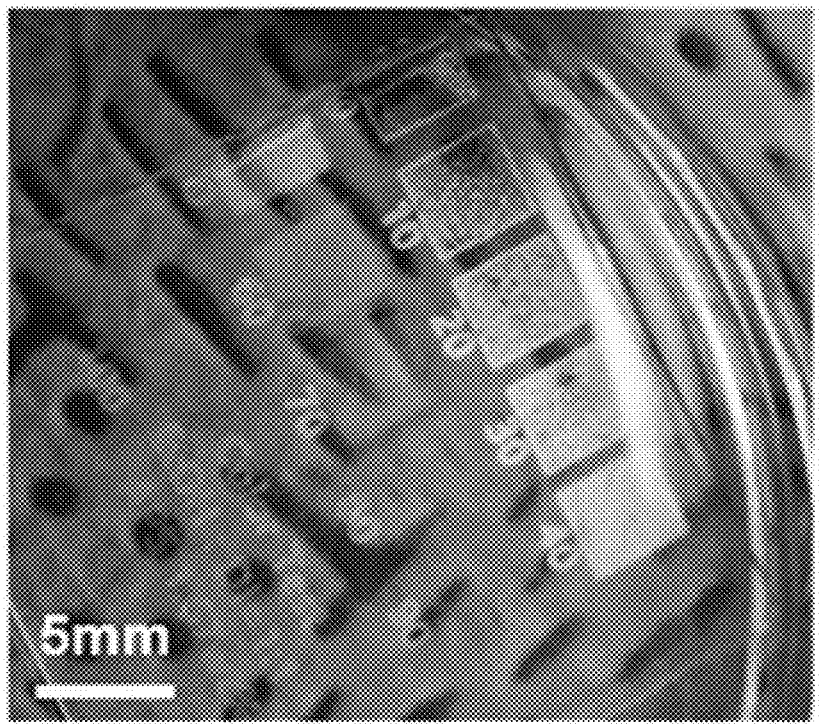

Referring to FIG. 9B, although a conventional inkjet printer expresses various colors according to relative ratios of red (R), green (G), and blue (B) inks, the photonic crystal structure according to the present invention may express various colors according to a contract ratio between black and white of a photonic crystal material. Referring to FIG. 9C, when the concentration of the photonic crystal material is high, the photonic crystal material is printed and absorbed into the polymer structure layer and is bonded to at least a portion of the first polymer domain in the polymer structure layer. As a result, the number of crosslinks in the first polymer domain increases, the maximum reflected wavelength of the photonic crystal structure may be blue-shifted. When the concentration of the photonic crystal material is low, the number of crosslinks is relatively small, and thus the maximum reflected wavelength of the photonic crystal structure may be red-shifted.

Figure 9D:
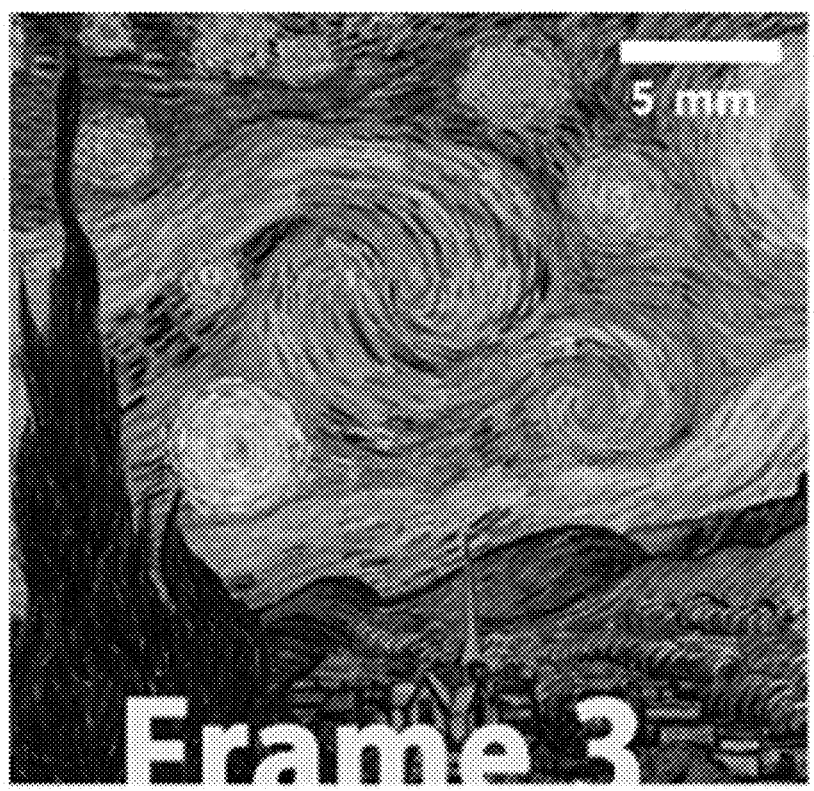
Figure 9E:

FIG. 9D is an image to which a photonic crystal material according to the present invention is programmed according to a contrast ratio with respect to an image to be expressed, and FIG. 9E is an image including a photonic crystal structure expressed in full colors by printing a programmed photonic crystal material as shown in FIG. 9D on a polymer structure layer. Referring to FIGS. 9D and 9E, the concentration of a photonic crystal material according to the present invention corresponds to colors of an image expressed in a photonic crystal structure.

Figure 9F:
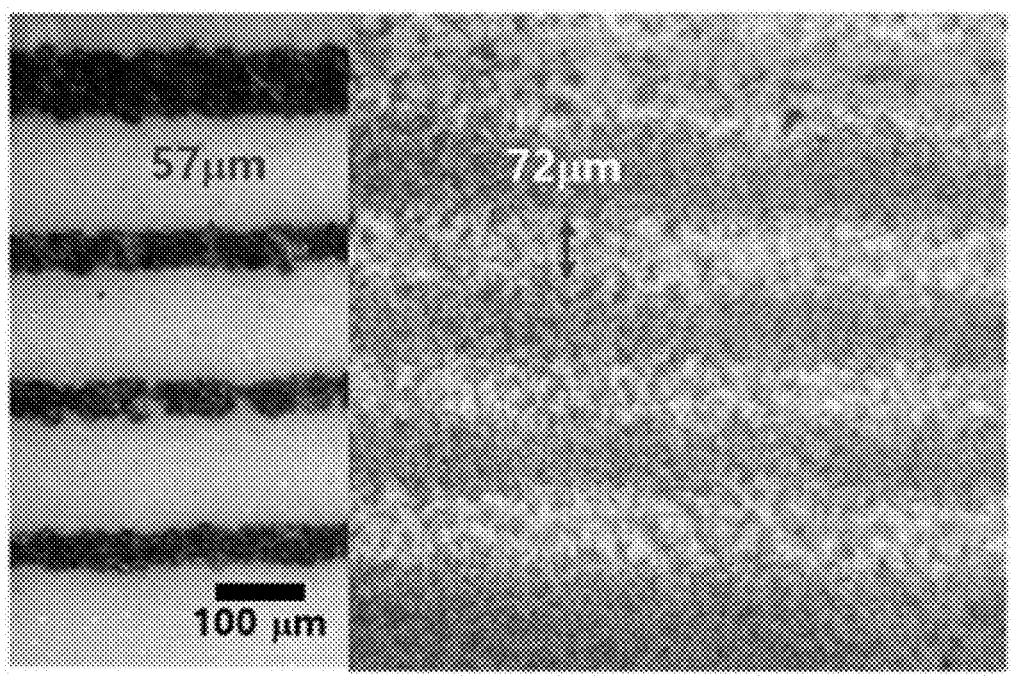

FIG. 9F is an image showing a comparison between the resolution of a general inkjet printer (left) and the resolution of an inkjet printer using a photonic crystal structure according to an embodiment of the present invention (right). A general inkjet printer using general R, G and B inks has a resolution of about 57 μm, whereas an inkjet printer using the photonic crystal structure has a resolution of about 72 μm. Therefore, even when a full color image is printed via an inkjet printer by using the photonic crystal structure, it may be seen that there are no remarkable differences from the resolution and quality of an image printed by using general inks.

Furthermore, one of the significant advantages of a photonic crystal structure according to an embodiment of the present invention is that the photonic crystal structure may be re-written and removed reversibly. In the photonic crystal structure, a crosslink may be formed and decomposed reversibly in the first polymer domain by using the photonic crystal material and the photonic crystal removing material.

Figure 10A:
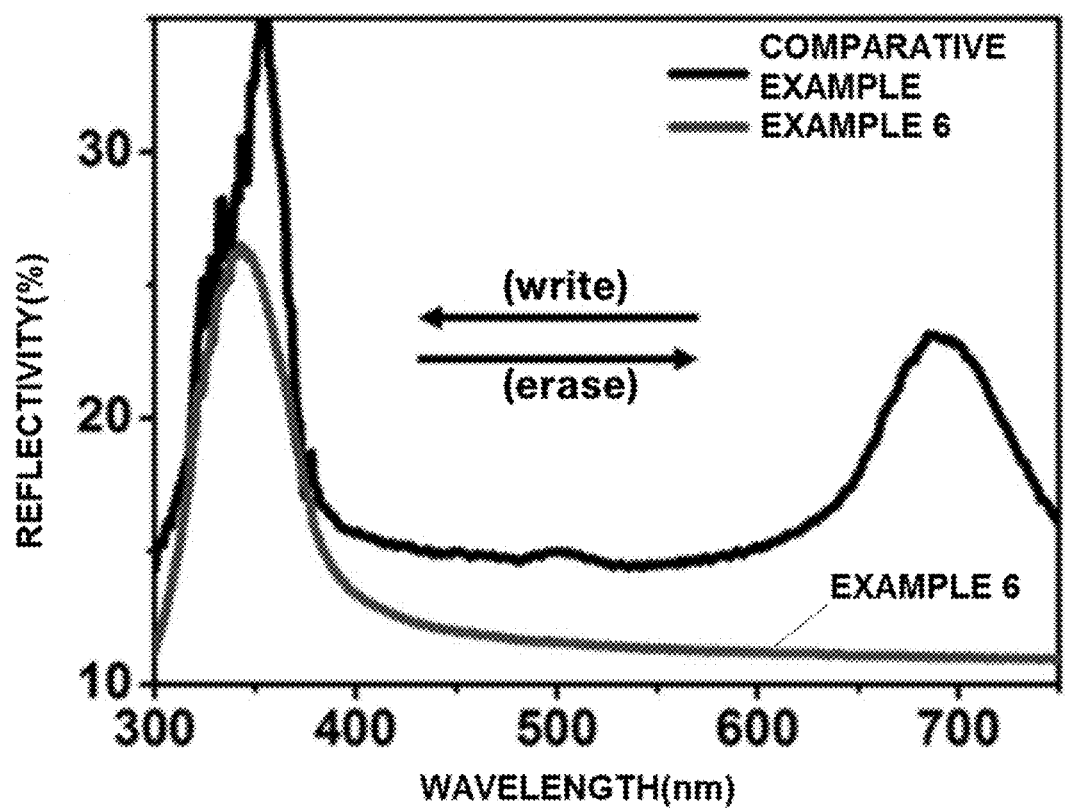
FIGS. 10A through 10C are diagrams showing results of a write-erasing functions of a photonic crystal structure according to an embodiment of the present invention In the following description, the same or similar elements are labeled with the same or similar reference numbers.
Figure 10B:
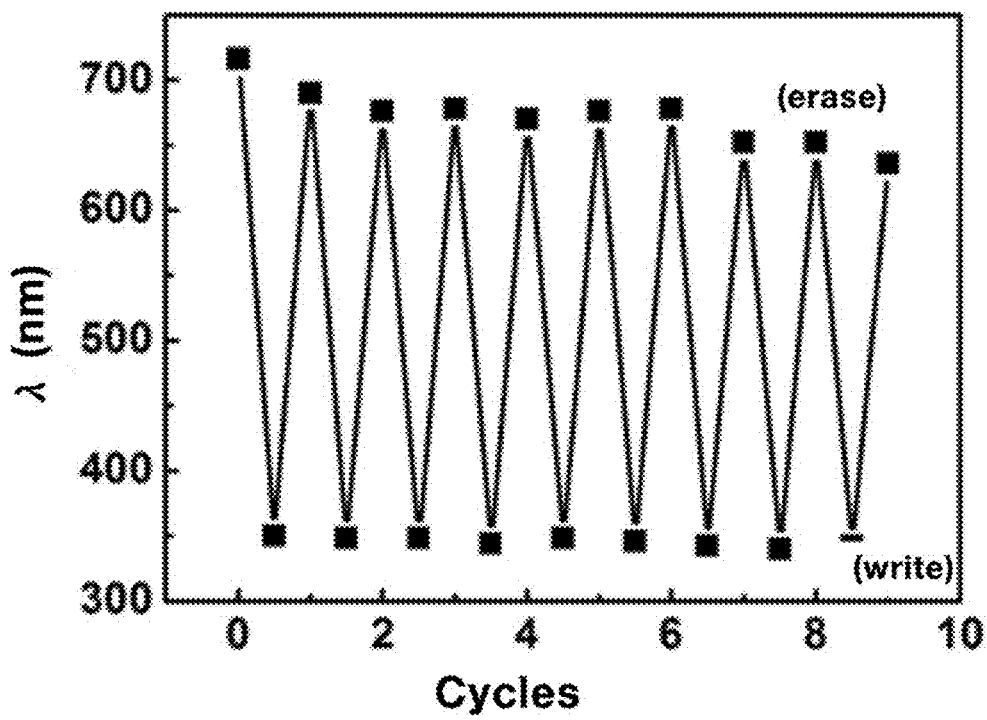
Figure 10C:
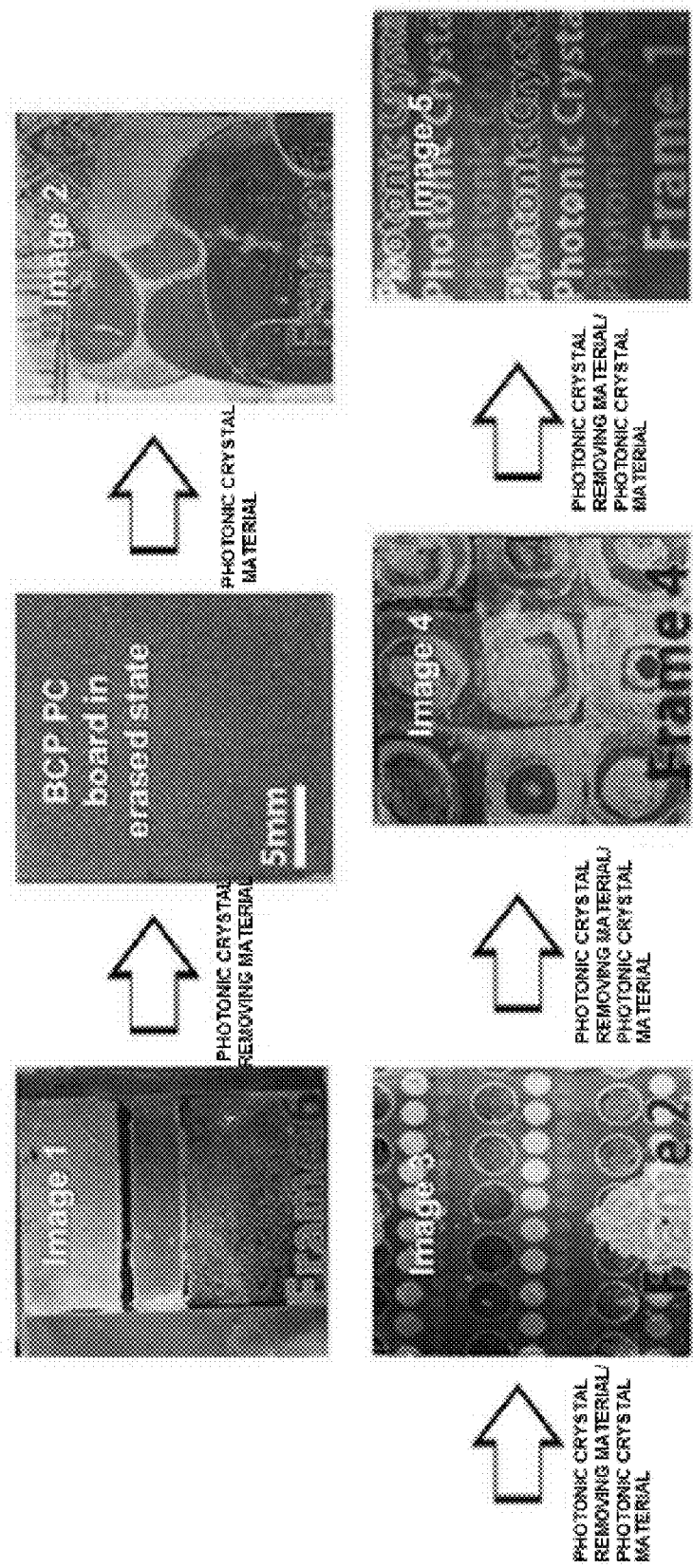

FIGS. 10A through 10C are diagrams showing results of a write-erasing functions of a photonic crystal structure according to an embodiment of the present invention.

As shown in FIG. 10A, it may be seen that a pure polymer structure layer, in which a photonic crystal material is not printed, exhibits the maximum reflection wavelength at about 360 nm (the left peak of the comparative example). In a photonic crystal structure layer formed by printing 1.67 wt % of ammonium persulfate (APS) as a photonic crystal material on the polymer structure layer, a crosslink is formed in the polymer structure layer, and thus the degree of selling may be reduced. Therefore, the photonic crystal material according to the comparative example may exhibit the maximum reflection wavelength at about 340 nm, which is slightly red-shifted as compared to the case of a pure polymer structure layer on which a photonic crystal material is not printed (Example 6). Next, when a photonic crystal structure layer having formed therein the crosslink is treated with hydrogen bromide (HBr), it may be confirmed that the crosslink is decomposed and the maximum reflection wavelength is exhibited at about 680 nm (the right peak of the comparative example). As described above, the photonic crystal removing material, such as hydrogen bromide, may be applied to reversibly decompose the crosslink in the polymer structure layer, thereby changing the maximum reflection wavelength.

FIG. 10b is a diagram showing a result of measuring the retention of a photonic crystal structure against repeated writing and erasing operations. Referring to FIG. 10B, it may be seen that, even when formation and decomposition of crosslinks in a polymer structure layer due to a photonic crystal material and a photonic crystal removing material are repeated 10 times or more, the maximum reflected wavelength is not significantly affected. The result indicates that an image based on a photonic crystal structure expressed by an inkjet printer may be easily and stably removed by a photonic crystal removing material, and new images may be repeatedly implemented by a photonic crystal material. An image using a photonic crystal structure according to an embodiment of the present invention, which is repeatedly written and erased, may be seen in FIG. 10C. For example, hydrogen bromide may be used as a photonic crystal removing material to erase an image already written to an image-expressing film layer containing a polymer structure layer, and ammonium sulfate may be used as a photonic crystal material to express a desired image on the polymer structure layer.

As described above, a photonic crystal structure according to an embodiment of the present invention may reversibly change displayable light, and thus the photonic crystal structure may be applied to a variety of photoelectric devices, such as an optical filter, a micro laser, an electroluminescent device, a photovoltaic device, an optical switch, and a sensor. Furthermore, the photonic crystal structure may not only be applied as a color filter in a reflection type display device, but also enable reversible display of various colors in various display devices, such as an electronic book (e-book) and a digital picture frame. Furthermore, the photonic crystal structure may also be applied for anti-forgery tag.

According to an embodiment of the present invention, a photonic crystal structure that may reflect light of certain wavelengths and may be re-written may be provided by printing a photonic crystal material reversibly bonded to a portion of at least one polymer domain or a photonic crystal removing material capable of decomposing a bonded photonic crystal material on a polymer structure layer including two or more polymer domains. Furthermore, by adjusting the concentration of a photonic crystal material to be printed on a polymer structure layer, a photonic crystal structure capable of expressing various photonic bandgaps according to degrees of bonding to at least some of polymer domains may be provided.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A photonic crystal structure comprising:
  a polymer structure layer comprising a first polymer domain and a second polymer domain; and
  a photonic crystal material configured to be reversibly bonded to at least a portion of the first polymer domain to adjust a degree of swelling of the first polymer domain, thereby reflecting a light of a certain wavelength.

2. The photonic crystal structure of claim 1, wherein the photonic crystal material comprises any one or more of ammonium persulfate, sodium persulfate, potassium persulfate, and butyl hydroperoxide.

3. The photonic crystal structure of claim 1, wherein the light of the certain wavelength to be reflected varies according to a concentration of the photonic crystal material.

4. The photonic crystal structure of claim 1, wherein the first polymer domain comprises any one or more of polyvinylpyridine, polymethylmethacrylate, poly(tert-butylacrylate), poly(ethylene oxide), polylactide, and polyhydroxystyrene.

5. The photonic crystal structure of claim 1, wherein the second polymer domain comprises any one or more of polystyrene, polyisoprene, polycyclohexylethylene, and polymethylstyrene.

6. The photonic crystal structure of claim 1, wherein the first polymer domain comprising the photonic crystal material has various thicknesses according to degrees of reversible bonding.

7. The photonic crystal structure of claim 1, wherein the light of the certain wavelength to be reflected is determined according to a thickness of the first polymer domain comprising the photonic crystal material.

8. The photonic crystal structure of claim 1, wherein the light comprises a visible ray.

9. The photonic crystal structure of claim 1, wherein the polymer structure layer has a laminar structure in which the first polymer domain and the second polymer domain are alternately stacked.

10. The photonic crystal structure of claim 1, wherein the bonding of the photonic crystal material is decomposed by printing a photonic crystal removing material on the photonic crystal structure having printed thereon the photonic crystal material.

11. The photonic crystal structure of claim 10, wherein the photonic crystal removing material is any one or more of hydrogen bromide, hydrochloric acid, and hydrogen iodide.

12. A method of fabricating a photonic crystal structure comprising:
    forming a polymer structure layer on a substrate through self-assemblies of block copolymers comprising a first polymer domain and a second polymer domain;
    printing a photonic crystal material that controls a domain of the polymer structure layer by being bonded to at least a portion of the polymer structure layer; and
    determining a light of a certain wavelength reflected from the polymer structure layer by reversibly bonding the photonic crystal material to the at least a portion of the polymer structure layer.

13. The method of claim 12, wherein the photonic crystal material comprises any one or more of ammonium persulfate, sodium persulfate, potassium persulfate, and butyl hydroperoxide.

14. The method of claim 12, wherein the light of the certain wavelength to be reflected varies according to a concentration of the photonic crystal material.

15. The method of claim 12, wherein the first polymer domain comprises any one or more of polyvinylpyridine, polymethylmethacrylate, poly(tert-butylacrylate), poly(ethylene oxide), polylactide, and polyhydroxystyrene.

16. The method of claim 12, wherein the second polymer domain comprises any one or more of polystyrene, polyisoprene, polycyclohexylethylene, and polymethylstyrene.

17. The method of claim 12, wherein the photonic crystal material is reversibly bonded to at least a portion of the first polymer domain.

18. The method of claim 17, wherein the first polymer domain comprising the photonic crystal material has various thicknesses according to a degree of reversible bonding.

19. The method of claim 17, wherein the light of the certain wavelength to be reflected is determined according to a thickness of the first polymer domain comprising the photonic crystal material.

20. The method of claim 12, further comprising, after the determining of the light, printing a photonic crystal removing material for decomposing a structure in which the photonic crystal material is bonded to a portion of the polymer structure layer.

21. A display device comprising a polymer structure layer comprising a first polymer domain and a second polymer domain and a photonic crystal structure including a photonic crystal material designed to be reversibly bonded to at least a portion of the first polymer domain to adjust a degree of swelling of the first polymer domain, thereby reflecting a light of a certain wavelength.

* * * * *